(12) United States Patent
Chandra et al.

(10) Patent No.: US 12,047,260 B2
(45) Date of Patent: Jul. 23, 2024

(54) SYSTEMS AND METHODS FOR NETWORK INCIDENT MANAGEMENT

(71) Applicant: Walmart Apollo, LLC, Bentonville, AR (US)

(72) Inventors: Gautam Chandra, Sunnyvale, CA (US); Zhaoyu Li, Cupertino, CA (US); Manas Vivek Samant, Sunnyvale, CA (US); Anusha Reddy Narapureddy, Milpitas, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/856,623

(22) Filed: Jul. 1, 2022

(65) Prior Publication Data

US 2023/0006901 A1   Jan. 5, 2023

Related U.S. Application Data

(60) Provisional application No. 63/218,220, filed on Jul. 2, 2021.

(51) Int. Cl.
*H04L 43/08* (2022.01)
*H04L 41/0686* (2022.01)
(Continued)

(52) U.S. Cl.
CPC .......... *H04L 43/08* (2013.01); *H04L 41/0686* (2013.01); *H04L 41/122* (2022.05); *H04L 41/147* (2013.01); *H04L 41/16* (2013.01)

(58) Field of Classification Search
CPC ... H04L 67/1095; H04L 67/104; H04L 43/08; H04L 41/0686; H04L 41/122; H04L 41/147; H04L 41/16
(Continued)

(56) References Cited

U.S. PATENT DOCUMENTS

| | | | |
|---|---|---|---|
| 2018/0039914 A1* | 2/2018 | Menahem | G06Q 10/20 |
| 2020/0210924 A1* | 7/2020 | Ghosh | G06N 5/022 |

(Continued)

FOREIGN PATENT DOCUMENTS

| | | |
|---|---|---|
| CN | 106886481 | 6/2017 |
| CN | 110297179 | 10/2019 |
| CN | 112433927 | 3/2021 |

OTHER PUBLICATIONS

J. Rao and C. -Z. Xu, "Online Capacity Identification of Multitier Websites Using Hardware Performance Counters," in IEEE Transactions on Parallel and Distributed Systems, vol. 22, No. 3, pp. 426-438, Mar. 2011, doi: 10.1109/TPDS. (Year: 2011).*

(Continued)

*Primary Examiner* — Meng Vang
(74) *Attorney, Agent, or Firm* — Foley IP Law, PLLC (57) ABSTRACT

Systems, apparatuses, and methods are provided herein for network incident management. A method for network incident management comprises aggregating network metrics associated with a monitored network in a historical network data database, identifying incidents based on the network metrics, generating a training data set based on the network metrics and the incidents, wherein the training data set comprises time series of network metrics as training input and incidents as labels, training an incident model using the training data set, receiving real-time network metrics from the network via the network interface, determining an incident prediction based on the incident model using the real-time network metrics as input, and causing a user interface device to provide an alert to a user based on the incident prediction.

18 Claims, 7 Drawing Sheets

(51) Int. Cl.
*H04L 41/122* (2022.01)
*H04L 41/147* (2022.01)
*H04L 41/16* (2022.01)

(58) Field of Classification Search
USPC ......................................................... 709/224
See application file for complete search history.

(56) References Cited

U.S. PATENT DOCUMENTS

| | | | |
|---|---|---|---|
| 2020/0226490 A1* | 7/2020 | Abdulaal | G06N 20/00 |
| 2020/0287779 A1* | 9/2020 | Zafer | H04L 41/0631 |
| 2020/0380336 A1 | 12/2020 | Chowdhury | |
| 2021/0019211 A1* | 1/2021 | Sghiouer | G06F 11/079 |
| 2021/0182730 A1* | 6/2021 | Clarke | G06N 20/00 |
| 2022/0334904 A1* | 10/2022 | Chesneau | G06F 11/0793 |

OTHER PUBLICATIONS

McKenna, Nicola et al.; "A new direction for IT user support: Enabling an omnichannel experience in the cognitive era"; IBM Global Technology Services; Published Oct. 2016; https://www.ibm.com/downloads/cas/XROVAMBJ; 12 pages.

IBM; "Analyzing predictive maintenancedata"; https://www.ibm.com/docs/en/mapms/3_cloud?topic=analyzing-predictive-maintenance-data; Mar. 3, 2021; 2 pages.

Vijayakumar, Sethu et al.; "Incremental Online Learning in High Dimensions"; Neural Computation; Jun. 1, 2005; vol. 17, Issue 12; Massachusetts Institute of Technology; pp. 2602-2634.

Hochreiter, Sepp et al.; "Long Short-Term Memory"; Neural Computation; Nov. 15, 1997, 1997; vol. 9, Issue 8; Massachusetts Institute of Technology; pp. 1735-1780.

Medsker, Larry et al.; "Recurrent Neural Networks: Design and Applications"; 1999; 1st Edition; CRC Press; 389 pages.

\* cited by examiner

SYSTEMS AND METHODS FOR NETWORK INCIDENT MANAGEMENT

CROSS-REFERENCE TO RELATED APPLICATION(S)

This application claims the benefit of U.S. Provisional Application No. 63/218,220 filed Jul. 2, 2021, which is incorporated herein by reference in its entirety.

TECHNICAL FIELD

This invention relates generally to computer network incident management.

BACKGROUND

Computer networks are made up of multiple hardware and software components that can cause errors and outages of a variety of reasons. Conventionally, when such outages occur, users cannot use the functionalities provided by the network and has to wait for an administrator to manually identify and address the issue to restore the network.

BRIEF DESCRIPTION OF THE DRAWINGS

Disclosed herein are embodiments of apparatuses and methods for providing network incident management. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein for providing network incident management. In some embodiments, a system for network incident management comprises a historical network data database, a network interface configured to receive data from a monitored system comprising a plurality of components, and a control circuit coupled to the historical network data database and the network interface. The control circuit being configured to aggregate system metrics from the monitored system in the historical network data database, identify incidents based on the system metrics, generate a training data set based on the system metrics and the incidents, wherein the training data set comprises time series of system metrics as training input and incidents as labels, train, with a machine learning algorithm, an incident model using the training data set, receive real-time system metrics from the network via the network interface, determine an incident prediction based on the incident model using the real-time system metrics as input, and cause a user interface device to provide an alert to a user based on the incident prediction.

Figure 1:
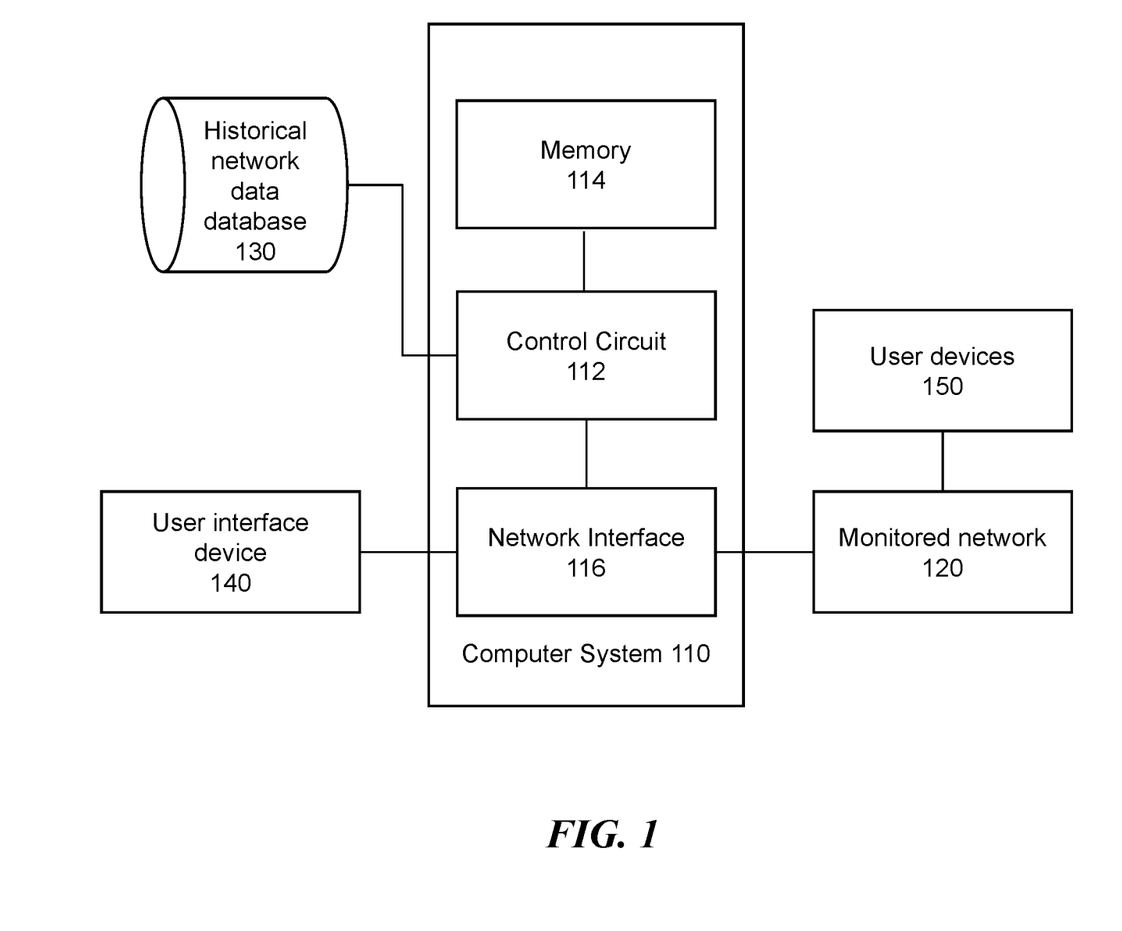
FIG. 1 comprises a block diagram of a system in accordance with some embodiments.

Referring now to FIG. 1, a system for network incident management is shown. The computer system 110 is coupled to a historical network data database 130, a user interface device 140, a monitored network 120 providing services to a plurality of user devices 150.

The computer system 110 comprises a control circuit 112, a memory 114, and a network interface device 116. The computer system 110 may comprise one or more of a server, a central computing system, a desktop computer system, a personal computer, a portable device, and the like. In some embodiments, the computer system 110 may be part of the monitored network 120. The control circuit 112 may comprise a processor, a microprocessor, a central processing unit (CPU), a graphics processing unit (GPU), an application-specific integrated circuit (ASIC), and the like and may be configured to execute computer-readable instructions stored on a computer-readable storage memory 114. The computer-readable storage memory 114 may comprise volatile and/or non-volatile memory and have stored upon it, a set of computer-readable instructions which, when executed by the control circuit 112, causes the computer system 110 to provide network incident predictions based on an incident model trained using network metrics stored in the historical network data database 130. In some embodiments, the computer-executable instructions may cause the control circuit 112 of the computer system 110 to perform one or more steps described with reference to FIGS. 2-4 herein. In some embodiments, the computer-executable instructions may cause the control circuit 112 of the computer system 110 to provide a user interface for viewing and interacting with the generated natural language explanation, such as the graphical user interfaces described with reference to FIGS. 5A-5C. In some embodiments, the memory 114 may further store the historical network data database 130.

The network interface device 116 may comprise a data port, a wired or wireless network adapter, and the like. In some embodiments, the computer system 110 may communicate with the user interface device 140 and the monitored network 120 over a network such as a local network, a private network, or the Internet. The user interface device 140 comprises user input/output devices such as a keyboard, a mouse, a touch screen, a display screen, a VR/AR display device, a speaker, a microphone, etc. In some embodiments, the user interface device 140 may be a processor-based standalone user device such as a personal computer, a desktop computer, a laptop computer, a mobile device, a smartphone, and the like. The user interface device 140 may execute an application for displaying a graphical user interface for displaying network incident predictions provided by the computer system 110. In some embodiments, the user interface device 140 may comprise the input/output user interface of the computer system 110 executing the program for viewing and interacting with the incident alerts provided by the computer system 110.

The historical network data database 130 comprises a computer-readable memory storage storing network data aggregated over time. Network data may comprise network metrics associated with hardware and/or software components of the network, such as one or more of order rate (e.g. order per minute (OPM), service request rate for multiple services, catalog service response time, checkout service response time, promotion engine service response time, health signals from network components (e.g. CPU, memory, garbage collection rate, lifetime), software signals (e.g. number of exceptions, types of exceptions, number of warnings, type of warnings, health status), network latency of all API calls, network congestion signals, HTTP fetch code, HTTP response code, Network errors, etc. In some embodiments, the network data may be aggregated from a plurality of components of the network such as CPU cluster, GPU cluster, storage cluster, database cluster, etc. In some embodiments, the network data comprise time series of aggregated network metrics data. In some embodiments, the historical network data database 130 further stores network incident records. In some embodiments, a network incident refers to when the monitored network 120 fails to timely or accurately provide data to user devices 150 in response to requests. In some embodiments, network incidents may include errors, high latencies, and outages. In some embodiments, only incidents exceeding a certain duration, frequency, and/or incidences within a time period may be recorded in the historical network data database 130. In some embodiments, the incidents may include a severity indicator (e.g. mild, medium, severe), an incident type indicator (e.g. error, high latency, outage), and/or an associated network component identifier (e.g. checkout service, promotion service, catalog service, inventory service, application server, POS server, etc.). In some embodiments, the aggregated network data and incidents may be oversampled to generate a training data set.

The monitored network 120 may be a system of one or more hardware and/or software components configured to provide functionality to user devices 150 over a network such as a private network or the Internet. In some embodiments, the monitored network 120 may comprise a retail server system including components such as a web server for an e-commerce website, an application server for a mobile application, a server for in-store point of sale systems, a catalog service, a checkout service, a promotion service, an inventory service, etc. that work together to facilitate in-store and/or online retail transactions. In some embodiments, the monitored network may further comprise network appliances such as routers, switches, firewall appliances, etc. In some embodiments, the monitored network 120 may comprise one or more physical devices implementing one or more components of the network such as CPU/GPU clusters, datastore clusters, memory clusters, etc. In some embodiments, the computer system 110 may be considered part of the monitored network 120 and execute one or more components of the monitored network.

The user devices 150 may generally be an electronic device used to access content and services provided by the monitored network 120 via a network such as the Internet or a private network. In some embodiments, the user interface device 140 may be a processor-based standalone user device such as a personal computer, a desktop computer, a laptop computer, a mobile device, a smartphone, a point of sale terminal, a self-checkout terminal, and the like. The user device 150 may comprise user input/output devices such as a keyboard, a mouse, a touch screen, a display screen, a VR/AR display device, a speaker, a microphone, etc. The user device 150 may execute an application or access a website provided by the monitored network. For example, the user device 150 may execute an e-commerce application that allows the user to view, select and purchase products or services via communications with the monitored network 120 over the Internet. The user devices 150 may generally be configured to send requests for data to the monitored network 120.

While one computer system 110 is shown, in some embodiments, the functionalities of the computer system 110 may be implemented on a plurality of processor devices communicating on a network. In some embodiments, the computer system 110 may be coupled to a plurality of user interface devices 140 and simultaneously support multiple instances of the user interface application on each user interface device 140 to provide incident alerts.

Figure 2:
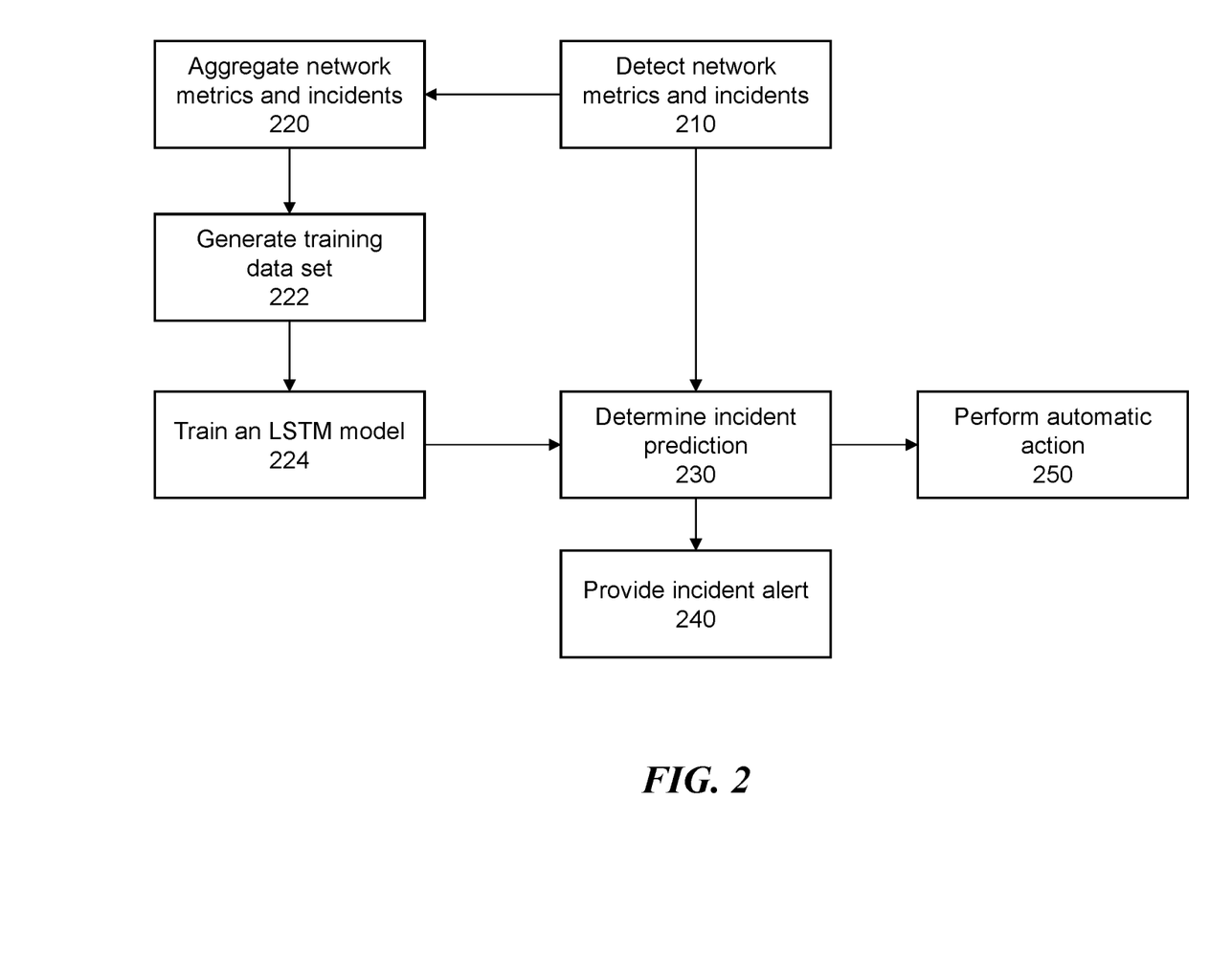
FIG. 2 comprises a flow diagram in accordance with some embodiments.

Referring now to FIG. 2, a method for providing network incident management is shown. In some embodiments, the steps shown in FIG. 2 may be performed by a processor-based device such as a control circuit executing a set of computer-readable instructions stored on a computer-readable memory. In some embodiments, one or more steps of FIG. 2 may be performed by the computer system 110 described with reference to FIG. 1 herein or a similar device.

In step 210, the system detects network metrics and incidents from a monitored network. In some embodiments, network metrics may include one or more of order rate (e.g. order per minute (OPM), service request rate for multiple services, catalog service response time, checkout service response time, promotion engine service response time, health signals from network components (e.g. CPU, memory, garbage collection rate, lifetime), software signals (e.g. number of exceptions, types of exceptions, number of warnings, type of warnings, health status), network latency of all API calls, network congestion signals, HTTP fetch code, HTTP response code, Network errors, etc. In some embodiments, network data may be aggregated from a plurality of software or hardware components of the network. For a retail system, the network components may comprise one or more of a web server for an e-commerce website, an application server for a mobile application, a server for in-store point of sale systems, a catalog service, a checkout service, a promotion service, etc. that work together to facilitate retail transactions via user devices. In some embodiments, the monitored network comprises an e-commerce server and the network metrics comprise one or more of an e-commerce orders rate from a plurality of e-commerce channels of the e-commerce server, page views, response time, throughput, network latency, network congestion signals, and/or HTTP codes.

In some embodiments, the system may be configured to automatically detect network incidents such as errors, high latencies, and outages based on network metrics. For example, a substantial and/or unexpected drop in OPM, response time, number of requests, etc. may indicate an incident. In some embodiments, one or more metrics may have an associated threshold and an incident may be detected if one or more metrics exceeds or falls below the corresponding threshold. In some embodiments, the system may also determine the duration of each detected incident based on the collected network metrics. In some embodiments, the incidents may include a severity indicator (e.g. mild, medium, severe), an incident type indicator (e.g. error, high latency, outage), and an associated network component identifier (e.g. checkout service, promotion service, catalog service, application server, POS server, etc.). In some embodiments, the aggregated network data and incidents may be oversampled. In some embodiments, the incidents may be determined by the system based on network metrics and/or manually entered by a network administrator.

Figure 4:
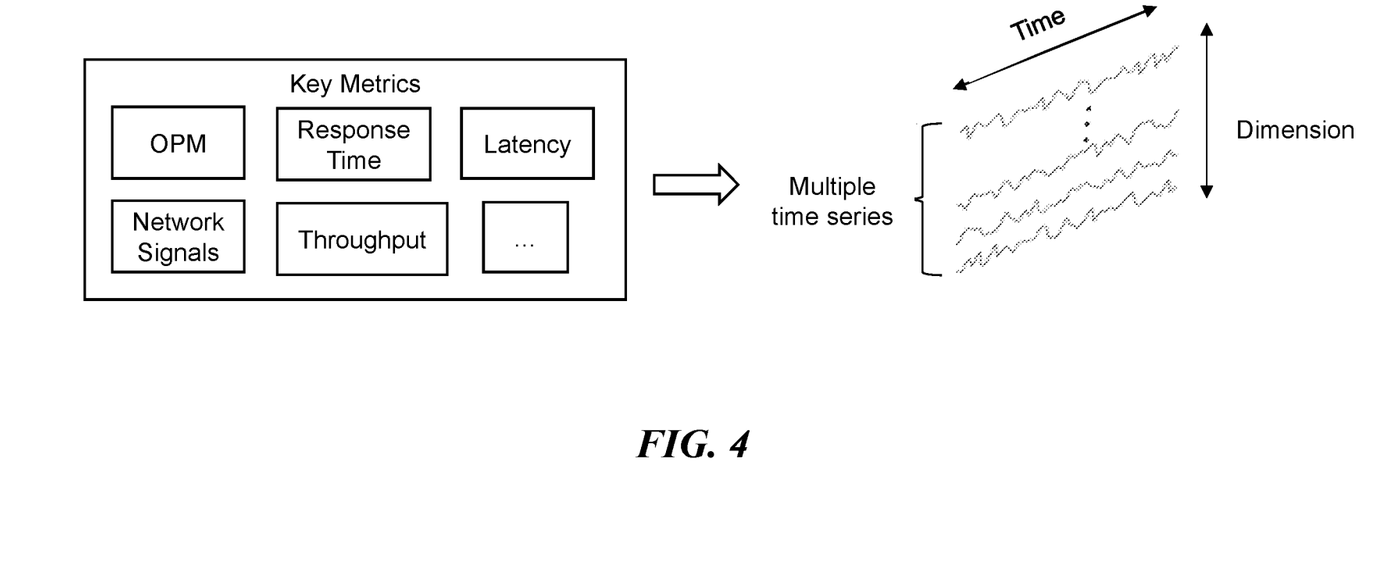
FIG. 4 comprises an illustration of time series data in accordance with some embodiments.

In step 220, collected network metrics are aggregated over time in a historical network data database. The network data may be aggregated and stored as time-series data. In step 222, the system generates a training data set based on the aggregated network metrics and incidents. In some embodiments, the training data set is generated based on oversampling the network metrics and the incident prediction. In some embodiments, the historical network metrics are converted to a 2D space with time and data type as dimensions. An illustration of the network metrics as multiple time series in a 2D space is shown in FIG. 4. In some embodiments, the training data set comprises time series of network metrics as training input and incidents as labels. In some embodiments, the labels may further specify the incident type, incident severity, associated component, etc. associated with each network incident. In some embodiments, the training data set may further be generated based on performing anomaly detection and removal on the aggregated network data.

In step 224, the system trains an incident model using the training data set based on a machine learning algorithm. In some embodiments, the incident model comprises a long-term short memory model (LSTM) trained based on shifting time windows of the time series of network metrics and incidents. In some embodiments, the machine learning algorithm is a recurrent neural network (RRN) algorithm. In some embodiments, the LSTM unknit may comprise a cell, an input gate, an output gate and a forget gate. The cell remembers values over arbitrary time intervals and the three gates regulate the flow of information into and out of the cell. In some embodiments, an RNN using LSTM units may be trained in a supervised fashion, on a set of training sequences, using an optimization algorithm, like gradient descent, combined with backpropagation through time to compute the gradients needed during the optimization process, in order to change each weight of the LSTM network in proportion to the derivative of the error (at the output layer of the LSTM network) with respect to corresponding weight. Generally, the incident model is trained to accept network metric time series as input and output incident predictions.

In step 230, the system determines an incident prediction based on the incident model using the real-time network metrics as input. In some embodiments, Time series of real-time network metrics are used as shifting window input of the incident model and the output of the incident model comprises the incident prediction. In some embodiments, the incident prediction comprises a future point in time and a likelihood indicator. The future point in time may be based on the length of the shifting time windows of the LSTM. The likelihood indicator may be based on the prediction confidence level of the LSTM. In some embodiments, the incident prediction comprises an incident type indicator, an incident severity indicator, or an indication of a network component. In some embodiments, an incident type indicator, an incident severity indicator, or an indication of a network component may be based on the type, severity, and associated components of the incidents in the training data set.

In step 240, the system provides an incident alert to a user via a user interface. In some embodiments, the alert includes the prediction point in time (e.g. 5 minutes) and likelihood (e.g. 20%). In some embodiments, the alert includes the incident type indicator, the incident severity indicator, or the indication of a network component. In some embodiments, the alert may further include a suggested action determined based on one or more of incident type, incident severity, and one or more associated network components. For example, if the incident is associated with a low checkout service throughput, the recommended action may be to increase CPU, GPU, or memory resources dedicated to the checkout service. In some embodiments, the incident probability may be constantly displayed in a user interface and a possible incident is identified when the incident probability exceeds a threshold. In some embodiments, the system may further generate a pop-up notification, sound alert, or send a message to a mobile device (e.g. via text, email, or application notification) when the incident probability exceeds a threshold.

Figure 5A:
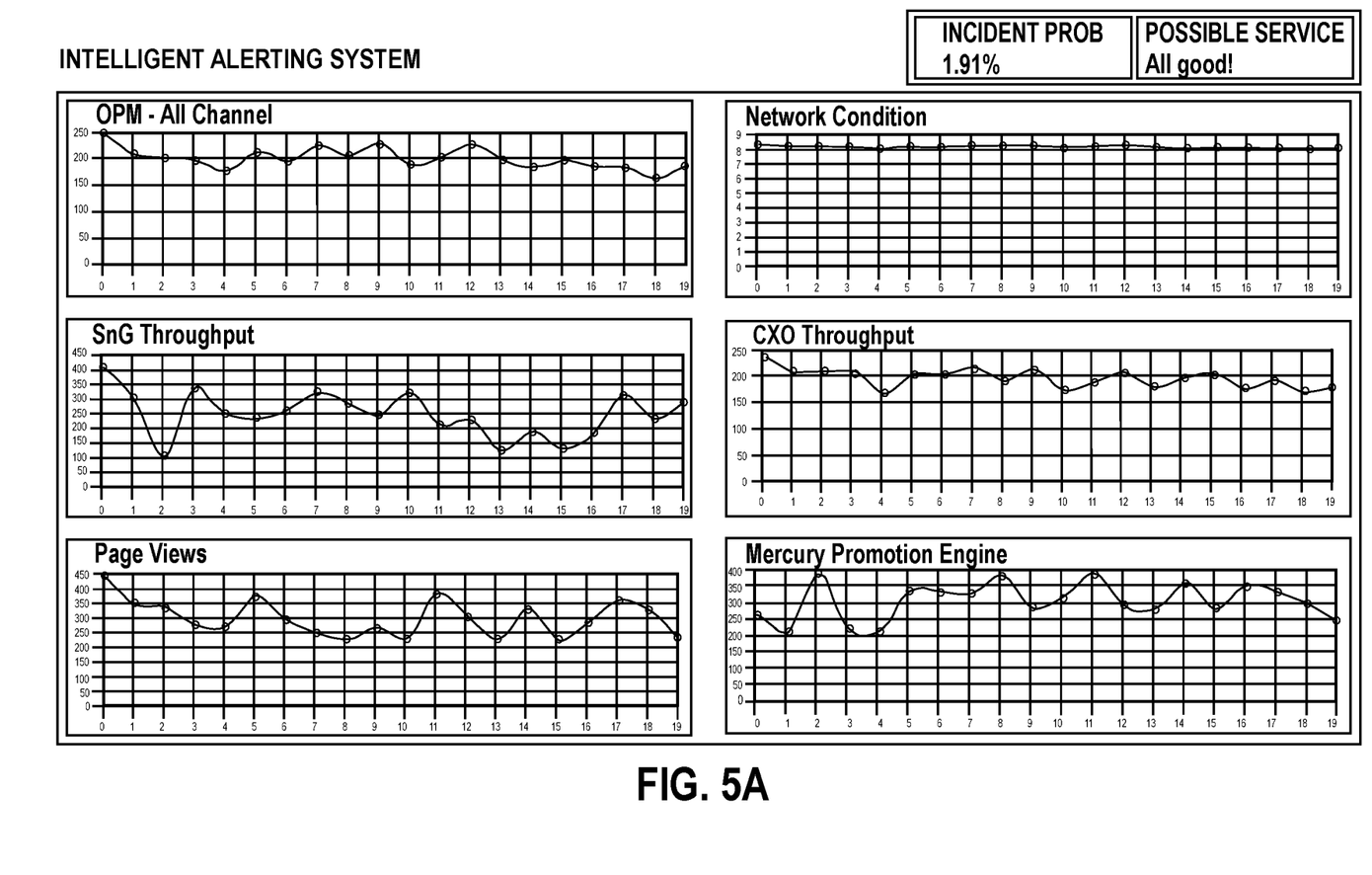
FIGS. 5A-5C comprises an illustration of an example user interface in accordance with some embodiments.
Figure 5B:
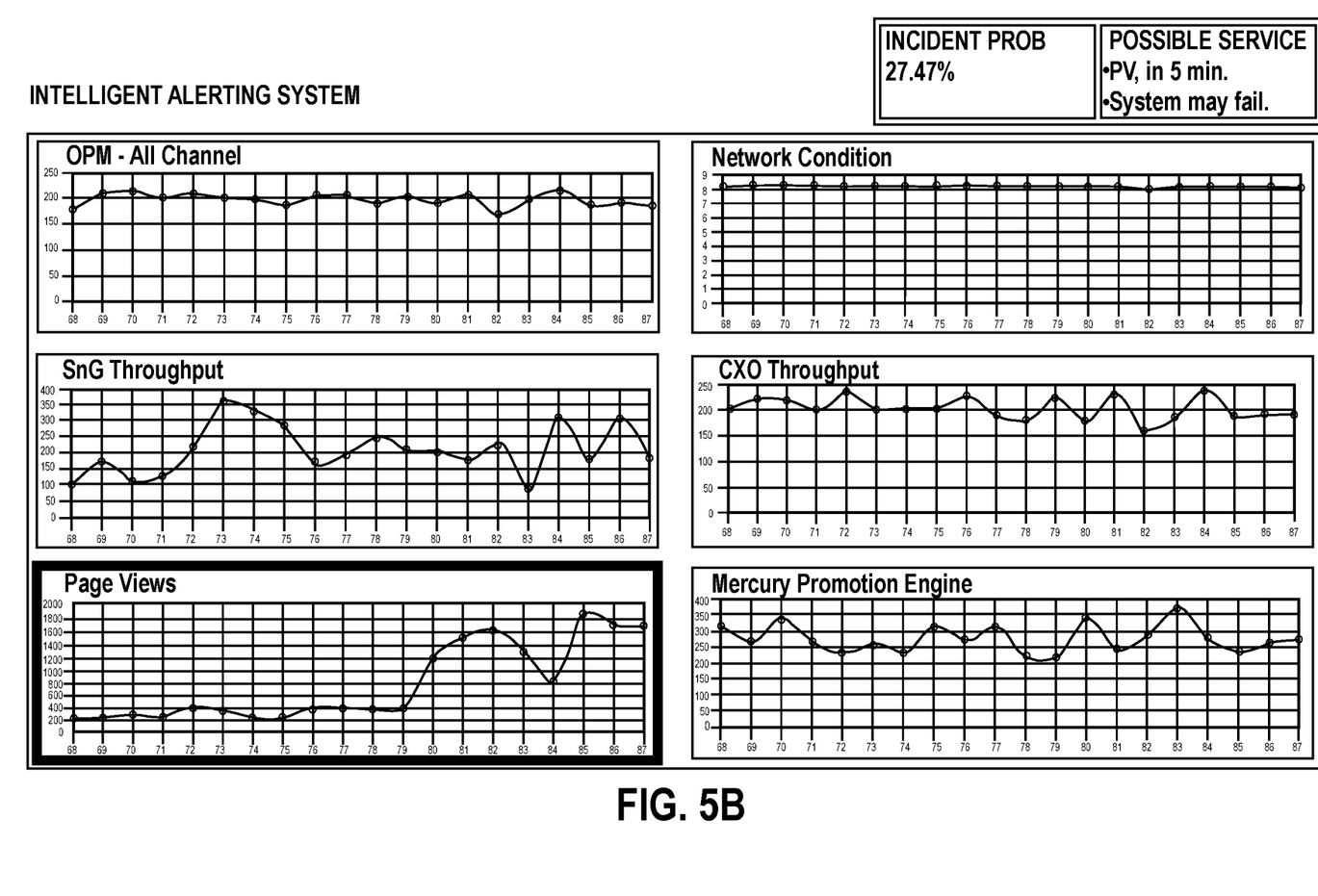
Figure 5C:
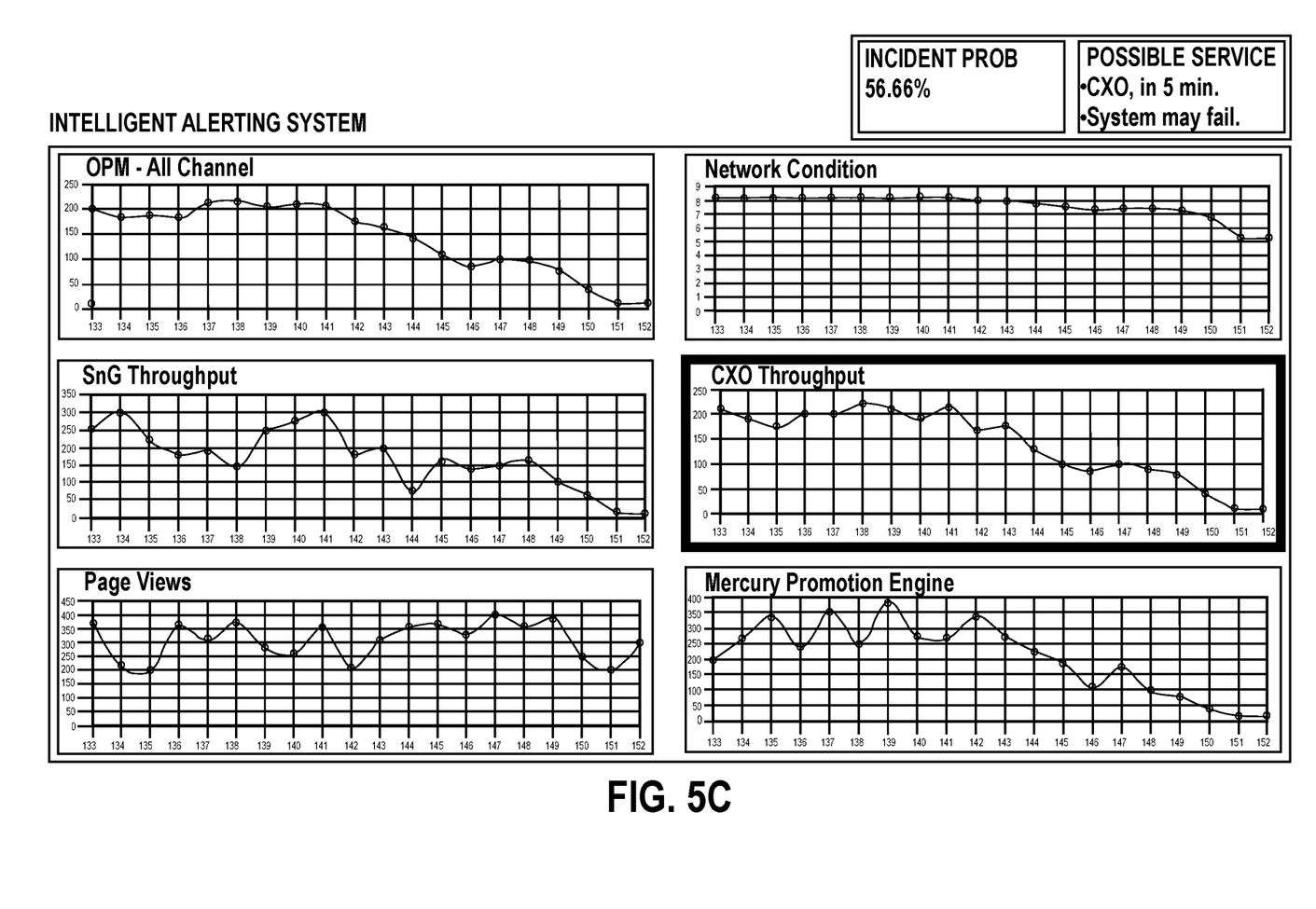

FIGS. 5A-C illustrates an example graphical user interface for providing incident alerts that may be displayed to a user via a user interface device such as the user interface device 140. In FIGS. 5A-C, line graphs are displayed to show real-time network metrics received at the system. Network metrics include OPM from all channels, network condition, mobile application (e.g. "scan-n-go" (SnG)) throughput, checkout (CXO) throughput, page views, and promotion engine throughput. Additional network metrics may be included in various embodiments. In FIG. 5A, the incident probability is determined to be at 1.91%, and no likely incident is identified. In FIG. 5B, the incident probability is identified as 27.47%, and the system identifies that page view indicates possible system failure in 5 minutes. the line graph showing real-time metrics for page views is further highlighted. In FIG. 5C, the incident probability is identified as 55.66%, and the system identifies that the checkout service throughput indicates possible system failure in 5 minutes. In some embodiments, the future point in time in the prediction may begin to count down once a likely incident is identified. In some embodiments, the incident probability, future point in time, and the associated network component may be continuously updated based on real-time network metrics. In some embodiments, the system may simultaneously display a plurality of possible service incident types associated with different components of the network. For example, alerts for CXO throughput and page view may be displayed at the same time for the same time frame. In some embodiments, the incident probability may be displayed for each service incident type and/or may be shown as a combined probability. In some embodiments, the user interface may further display a suggested preventive action based on the incident type, severity, and/or component.

In some embodiments, in step 250, the system automatically sends an instruction to at least one component of the network to cause a change at the component of the network based on the incident prediction before a predicted incident time. For example, the system may cause more memory or CPU/GPU to be assigned/released to a service if a predicted incident is associated with the service component's low throughput. In another example, if a predicted incident is associated with low storage space, the system may cause additional storage space to be released to the service. In some embodiments, the automatic action may be retrieved from a lookup table associating incident type and/or component with preventive actions.

In some embodiments, the system may continuously update the incident model based on the real-time network metric and detected incidents, including the network metrics used to make the prediction. In some embodiments, after a preventive action is taken either manually by an administrator or automatically by the system, the system may further record the action and whether the incident is successfully prevented by the action. The recorded action and subsequent changes in network matric may be used for future preventive action recommendations and/or automatic action.

Figure 3:
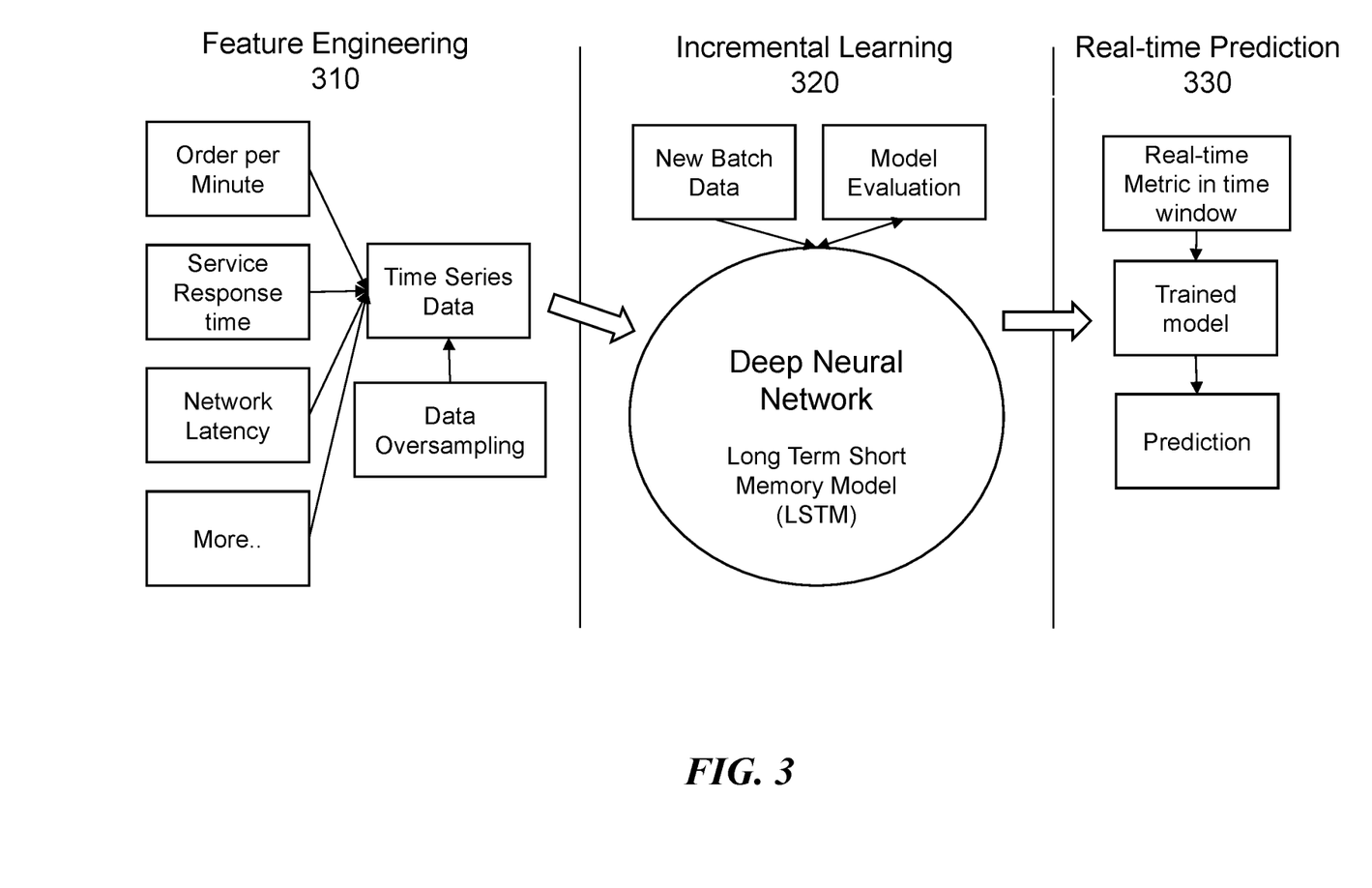
FIG. 3 comprises a process diagram in accordance with some embodiments.

Referring now to FIG. 3, a process for network incident management is shown. In some embodiments, the process shown in FIG. 3 may be performed by a processor-based device such as a control circuit executing a set of computer-readable instructions stored on a computer-readable memory. In some embodiments, one or more steps of FIG. 3 may be performed by the computer system 110 described with reference to FIG. 1 herein or a similar device.

In the feature engineering stage 310, network metrics such as order per minute, service response time, network latency, etc. are aggregated from components of a network into time-series data. Data oversampling is applied to the time-series data to generate a training data set.

In the incremental learning stage 320, the training data set is used to train an LSTM using a deep neural network algorithm. The model is updated to by new batched data continuously or periodically and undergoes continuous model evaluation.

In the real-time prediction stage 330, real-time metrics in shifting time window are feed into the trained LSTM which outputs the incident prediction.

When networks go down, companies are often left scrambling to deal with a wide range of costly consequences. For example, during downtimes of e-commerce systems, customers cannot shop or checkout, leading to loss of revenue. Frequent outages also lead to negative customer experience and brand reputation. Often, the restoration path can be costly and result in a workflow backup. In some embodiments, the methods and systems described herein use machine learning algorithms to detect hidden pattern fluctuations in the system signals and alert the support ahead of time such that preemptive actions can be taken to prevent the whole system from going down.

In some embodiments, the systems described herein include three components: feature engineering, incremental learning, and real-time prediction. For the feature engineering, the system aggregates many system metrics like order per minute, service response time, network latency, etc., and converts them into time-series data. In the meantime, data oversampling is used to solve the imbalanced distribution of labels. For the learning process, the system is using Deep Recurrent Neural Network, which is a machine learning algorithm for predicting time-series data. The system further uses incremental learning which allows it to update the model with newly available data. Model evaluation is also performed to improve the incident model's performance. Lastly, in the real-time prediction, real-time metric data in a time window is fed into the model and get a prediction of system failures.

In some embodiments, the training data includes a list of historical system metrics with oversampling. These data may be converted to a 2D space with time and data type as dimensions. In some embodiments, historical system metrics include but are not limited to OPM (Order Per Minute) trends, Response time, Network Latency, Network congestion signals, HTTP codes, etc. In some embodiments, the system is configured to monitor thousands of real-time system metrics and automatically respond to the changes which could bring down the e-commerce site.

In some embodiments, the system can learn hidden patterns from past retail data and predict failures before they occur. In some embodiments, the system utilizes Deep Neural Network to turn real system metric data into time-series data, and train the model on the past data and real-time data for prediction. In some embodiments, the system may increase downtime resilience of a network system.

In one embodiment, a system for network incident management comprises a historical network data database, a network interface configured to receive data from a network comprising a plurality of components; and a control circuit coupled to the historical network data database and the network interface, the control circuit being configured to aggregate network metrics from the monitored network in the historical network data database, identify incidents based on the network metrics, generate a training data set based on the network metrics and the incidents, wherein the training data set comprises time series of network metrics as training input and incidents as labels, train, with a machine learning algorithm, an incident model using the training data set, receive real-time network metrics from the network via the network interface, determine an incident prediction based on the incident model using the real-time network metrics as input, and cause a user interface device to provide an alert to a user based on the incident prediction.

In one embodiment, a method for network incident management comprises aggregating, by a control circuit and via a network interface, network metrics associated with a monitored network in a historical network data database, identifying, with the control circuit, incidents based on the network metrics, generating, with the control circuit, a training data set based on the network metrics and the incidents, wherein the training data set comprises time series of network metrics as training input and incidents as labels, training, with a machine learning algorithm executed on the control circuit, an incident model using the training data set, receiving real-time network metrics from the network via the network interface, determining, with the control circuit, an incident prediction based on the incident model using the real-time network metrics as input, and causing a user interface device to provide an alert to a user based on the incident prediction.

In one embodiment, an apparatus for network incident management comprises a non-transitory storage medium storing a set of computer readable instructions, and a control circuit configured to execute the set of computer readable instructions which cause to the control circuit to aggregate, via a network interface, network metrics associated with a monitored network in a historical network data database, identify incidents based on the network metrics, generate a training data set based on the network metrics and the incidents, wherein the training data set comprises time series of network metrics as training input and incidents as labels, train, with a machine learning algorithm, an incident model using the training data set, receive real-time network metrics from the network via the network interface, determine an incident prediction based on the incident model using the real-time network metrics as input, and cause a user interface device to provide an alert to a user based on the incident prediction.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for network incident management, the system comprises:
    a historical network data database;
    a network interface configured to receive data from a monitored network comprising a plurality of components; and
    a control circuit coupled to the historical network data database and the network interface, the control circuit being configured to:
    aggregate network metrics from the monitored network in the historical network data database, wherein the monitored network comprises an e-commerce server and the aggregated network metrics include e-commerce orders per minute (OPM), response time, and network latency corresponding to e-commerce channel(s) of the e-commerce server;
    identify incidents based on the aggregated network metrics;
    generate, based on the aggregated network metrics and the incidents, a training data set that includes multiple time series for the OPM, the response time, and the network latency as training input, wherein historical incidents are labeled on the multiple time series;
    train, with a machine learning algorithm, an incident model using the training data set;
    receive real-time network metrics from the monitored network via the network interface;
    predict future incident(s) based on the trained incident model using the real-time network metrics as input; and
    cause a user interface device to provide an alert to a user based on the predicted future incident(s).

2. The system of claim 1, wherein the aggregated network metrics further comprise page views, throughput, network congestion signals, or HTTP codes.

3. The system of claim 1, wherein the training data set is generated based on oversampling the aggregated network metrics and the predicted future incident(s).

4. The system of claim 1, wherein the incident model is a long-term short memory model (LSTM) trained based on shifting time windows of the time series of network metrics and incidents.

5. The system of claim 1, wherein the predicted future incident(s) comprises a future point in time and a likelihood indicator.

6. The system of claim 1, wherein the predicted future incident(s) comprises an incident type indicator, an incident severity indicator, or an indication of a network component.

7. The system of claim 1, wherein the control circuit is further configured to automatically send an instruction to at least one component of the monitored network to cause a change at the at least one component of the monitored network based on the predicted future incident(s) before a predicted incident time.

8. The system of claim 1, wherein the control circuit is further configured to update the incident model based on the real-time network metrics and detected incidents.

9. The system of claim 1, wherein the plurality of components comprises a central processing unit cluster, a storage cluster, and a database cluster.

10. A method for network incident management, the method comprises:
    aggregating, by a control circuit and via a network interface, network metrics associated with a monitored network in a historical network data database, wherein the monitored network comprises an e-commerce server and the aggregated network metrics include e-commerce orders per minute (OPM), response time, and network latency corresponding to e-commerce channel(s) of the e-commerce server;
    identifying, with the control circuit, incidents based on the aggregated network metrics;
    generating, with the control circuit, based on the aggregated network metrics and the incidents, a training data set that includes multiple time series for the OPM, the response time, and the network latency as training input, wherein historical incidents are labeled on the multiple time series;
    training, with a machine learning algorithm executed on the control circuit, an incident model using the training data set;
    receiving real-time network metrics from the monitored network via the network interface;
    predicting future incident(s) based on the trained incident model using the real-time network metrics as input; and
    causing a user interface device to provide an alert to a user based on the predicted future incident(s).

11. The method of claim 10, wherein the aggregated network metrics further comprise page views, throughput, network congestion signals, or HTTP codes.

12. The method of claim 10, wherein the training data set is generated based on oversampling the aggregated network metrics and the predicted future incident(s).

13. The method of claim 10, wherein the incident model is a long-term short memory model (LSTM) trained based on shifting time windows of the time series of network metrics and incidents.

14. The method of claim 10, wherein the predicted future incident(s) comprises a future point in time and a likelihood indicator.

15. The method of claim 10, wherein the predicted future incident(s) comprises an incident type indicator, an incident severity indicator, or an indication of a network component.

16. The method of claim 10, further comprising:
    automatically send an instruction to at least one component of the monitored network to cause a change at the at least one component of the monitored network based on the predicted future incident(s) before a predicted incident time.

17. The method of claim 10, further comprising:
    updating the incident model based on the real-time network metrics and detected incidents.

18. An apparatus comprising:
    a processor; and
    a non-transitory storage medium storing computer readable instructions that, when executed by the processor, cause the processor to:
    aggregate network metrics from a monitored network in a historical network data database, wherein the monitored network comprises an e-commerce server and the aggregated network metrics include e-commerce orders per minute (OPM), response time, and network latency corresponding to e-commerce channel(s) of the e-commerce server;
    identify incidents based on the aggregated network metrics;
    generate, based on the aggregated network metrics and the incidents, a training data set that includes multiple time series for the OPM, the response time, and the network latency as training input, wherein historical incidents are labeled on the multiple time series;
    train, with a machine learning algorithm, an incident model using the training data set;

receive real-time network metrics from the monitored network via a network interface;
predict future incident(s) based on the trained incident model using the real-time network metrics as input; and
cause a user interface device to provide an alert to a user based on the predicted future incident(s).

\* \* \* \* \*